(12) United States Patent
Rowe

(10) Patent No.: US 6,324,492 B1
(45) Date of Patent: Nov. 27, 2001

(54) SERVER STRESS TESTING USING MULTIPLE CONCURRENT CLIENT SIMULATION

(75) Inventor: Michelle M. Rowe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/009,286

(22) Filed: Jan. 20, 1998

(51) Int. Cl.[7] ............................... G06F 9/00; G06F 15/16
(52) U.S. Cl. ........................... 703/13; 370/241; 709/100; 709/203
(58) Field of Search ............................ 370/241; 709/106, 709/203, 200, 100, 102, 107, 108; 702/108, 122; 703/13, 22, 21

(56) References Cited

U.S. PATENT DOCUMENTS

| | | | |
|---|---|---|---|
| 5,761,486 | * | 6/1998 | Watanabe et al. ...................... 703/21 |
| 5,812,780 | * | 9/1998 | Chen et al. ........................... 709/224 |
| 5,881,269 | * | 3/1999 | Dobbelstein .......................... 703/21 |
| 5,946,474 | * | 8/1999 | Skogby ................................. 703/13 |

* cited by examiner

Primary Examiner—Huy D. Vu
Assistant Examiner—Kevin L. Harper
(74) Attorney, Agent, or Firm—Workman, Nydegger & Seeley

(57) ABSTRACT

Method and system for simulating multiple concurrent clients on a network server to stress test the server. Each of one or more processors has one executable software thread, the send data thread, whereby I/O requests are initiated on behalf of all simulated clients. Each of the one or more processors has another executable software thread, the receive data thread, whereby I/O response data is received from the server on behalf of all simulated clients. A software object, such as a completion port, that is capable of detecting completion of an executable event allows the stress test to function using only two executable threads per processor. The efficiency of the server can be measured as the send data thread initiates I/O requests and as the server responds thereto. The stress test is flexible in that the number of simulated clients and the I/O requests initiated can vary widely. Moreover, many different types of network servers can be tested.

26 Claims, 12 Drawing Sheets

SERVER STRESS TESTING USING MULTIPLE CONCURRENT CLIENT SIMULATION

BACKGROUND OF THE INVENTION

1. The Field of the Invention

The present invention relates to stress testing of network servers, wherein a plurality of concurrent network clients are simulated. More particularly, the present invention relates to stress testing of a network server in which multiple clients are simulated by executing one executable software thread on each of one or more processors, whereby I/O requests are initiated to the server on behalf of all clients. The stress testing of the present invention further includes executing another executable software thread on each of the one or more processors, whereby I/O response data from the server is received on behalf of all clients.

2. The Prior State of the Art

In recent years, use of servers has become common in both local area and wide area networks. Such networks allow multiple computer users to access the processing capabilities of the network server. In local area networks, network users can share information and gain access to software applications stored and executed in the server. Local area networks are also useful for providing rapid and convenient communication between users. Relatively inexpensive terminals can benefit from the typically more powerful computing capabilities of the server.

Wide area networks, such as the Internet, have become popular due to the ease with which network users at remote locations are able to retrieve and share information. For example, World Wide Web servers allow remote users to download text, graphics, multimedia materials, or to take advantage of network applications stored and executed by the server. Electronic mail servers present users with a quick and convenient means of telecommunication. Chat servers have also become increasingly popular in large measure for their ability to provide real-time communication between remote users. Users of a networked chat service can select from a great number of topics, join a chat service channel, and contribute to an ongoing discussion on the topic. Chat services can have substantial entertainment, informational, and educational value. It can be expected that in coming years, local area and wide area networks will become increasingly important as the related technology becomes more widespread and accepted.

One of the significant advantages of network servers is that they provide processing services to multiple concurrent clients. It is important for a network provider to ensure that a server is powerful enough to service a large number of simultaneous clients at peak times. Many network users, particularly of the Internet, have experienced delayed response times during hours of high usage. When a network provider fails to maintain a server with sufficient speed and multiple client capability, the inconvenienced users are often frustrated and can lose interest in the services of the network provider. However, it is often difficult to predict beforehand how a server will respond to high volumes of file uploads or downloads or other input/output (I/O) requests and client actions. Often, a network provider does not discover that server resources are inadequate until after a large number of clients are inconvenienced.

It is particularly important to ensure that sufficient server capabilities are on hand when a network provider stages a well publicized chat session. For example, it has become increasingly common for chat server providers to advertise for and provide sessions in which users may communicate with celebrities. In such cases, it is common to receive requests for access from remote users in volumes that are much greater than those of typical chat sessions. Network providers who conduct such large-volume chat sessions naturally want to have adequate server capabilities, but may find it difficult to know if their resources are sufficient. When hundreds or thousands of simultaneous users are expected to generate I/O requests to a server installation, it is impractical to conduct tests using actual clients, and it may be impossible to rely on past experience.

In order to predict whether a chat server, or any other network server, is powerful enough to handle peak volume of a specified magnitude, there have been developed test methods of simulating multiple concurrent network clients to the server. Seen in FIGS. 1 and 2 is one such method that is known in the art. FIG. 1 illustrates the arrangement and relationship of elements within a client simulator computer and the network, while FIG. 2 depicts the steps of the method in flow chart form.

Referring now to FIG. 1, at least one client simulator computer is connected to server 60 in order to provide simulated I/O requests. Executable software threads are initiated and dedicated to each of a plurality of simulated clients in a one-to-one relationship. Accordingly, if a test is designed to simulate 1,000 concurrent clients, there will be 1,000 dedicated client threads 62. Each dedicated client thread 62 is associated with a client profile 64 for one of the simulated clients. Dedicated client thread 62 initiates and sends I/O requests on behalf of its simulated client to an associated socket 68. The I/O requests are forwarded through network communication infrastructure 70 to server 60. A switching module 66, such as a context switching routine or the like, is used to assign one of the dedicated client threads 62 to the processor of the client simulator computer. If the client simulator computer has only one processor, only one of dedicated client threads 62 may run at any one time.

Each client profile 64 typically assigns to the simulated client a set of simulated characteristics, such as the frequency of making I/O requests, the type of I/O requests to be made, and the states that are possible. For example, a first simulated client may be designated as a normal chat client who makes I/O requests every 30 seconds on average. The first simulated client may be allowed to join a chat channel from the logged-on state and to make a series of I/O request, 95% of which may be talk messages to the server, with 5% being requests to part or exit the channel. A second simulated client may be designated as one who joins the channel and does little more than read posted messages while contributing none of its own. Another simulated client may be designated as a host, while still another may be assigned to be the systems operator (sysop). In any event, client profiles 64 are designed to mimic the actions that actual network clients are likely to make.

Each dedicated client thread 62 repeatedly reads and updates the information stored in the associated client profile 64. In operation, a dedicated client thread 62 executes step 72 of FIG. 2 by reading and evaluating the state of its simulated client from the associated client profile 64. For example, it may be determined that the simulated client is in a logged-on state. Next, in step 74, dedicated client thread 62 selects an I/O request for its simulated client from among the permissible requests for a client in the logged-on state. For example, a request to join a chat channel may be selected. In step 78, the I/O request is initiated and sent to an associated socket 68 and in turn sent through the network communication infrastructure 70 to the server 60.

After sending an I/O request, the dedicated client thread 62 waits, in step 80, for a response from server 60. When the I/O request is completed, I/O response data thereby generated is sent from server 60 back to the appropriate socket 68 through network communication infrastructure 70. The associated dedicated client thread 62 detects the response to the I/O request and retrieves information from its socket 68 in step 82. Dedicated client thread 62 then determines, according to step 84, whether the response indicates that the state of the associated simulated client should be changed, for example, from logged-in to in-channel. According to step 86, if no change is to be made, the routine reverts to step 72. If the simulated client should be moved to a new state, the appropriate changes are made in client profile 64, as shown in step 88, after which dedicated client thread 62 is ready to begin the cycle once again. At any time during execution of the foregoing steps, dedicated client thread 62 is generally subject to losing and regaining access to the processor according to a switching protocol executed by switching module 66.

A suitable stress test should satisfy at least four criteria. First, the simulated clients must perform a wide variety of actions that closely approximate the behavior of actual clients. Second, the number of simulated clients must be as large as desired. Third, the method used for simulating clients must be fast enough to handle the response from the server so as not to create an artificial bottleneck. Finally, the method is preferably generic so that it can be customized to simulate a wide variety of clients and client behavior.

The foregoing prior art method of assigning each simulated client a dedicated thread becomes inefficient once the number of simulated clients becomes sufficiently large. Thus, the known methods do not satisfactorily meet the second of the criteria listed above in that the number of clients that may be simulated is limited. When there are many clients, context switching between threads consumes a large portion of the resources of the simulating machine. This can cause the results of the stress test to be inadequate, since the simulation may not be able to generate I/O requests as quickly as would be required. It has been found that an appreciable amount of computer resources may be consumed in context switching between as few as 40 dedicated client threads.

Further, conventional operating systems on which the prior art stress testing systems are conducted typically have structural limits to the number of executable threads that may be supported. For instance, Microsoft Windows NT scales to about 2,000 threads. Accordingly, stress tests running on a Windows NT system with only one processor have been limited to about 2,000 simulated clients. This is unsatisfactory for testing servers that may be called on to serve many times that number of actual clients.

It would, therefore, be desirable to have a stress testing method to simulate a number of clients that is larger than the number of threads supported by conventional operating systems. In particular, it would be advantageous to provide a stress testing method to simulate a number of clients that is not limited by the operating system or the context switching capabilities of the machine on which it runs. It would be advantageous to provide a method for initiating I/O requests for a large number of simulated clients wherein the amount of computer resources dedicated to switching between executable threads is minimized. It would also be desirable to have such a testing method that is flexible such that a wide variety of servers could be tested.

SUMMARY OF THE INVENTION

The foregoing problems in the prior state of the art have been successfully overcome by the present invention According to the invention, I/O requests are initiated on behalf of as many simulated clients as desired using a number of executable software threads that is optimally equal to the number of processors that are used to conduct the stress test. Likewise, I/O response data is received on behalf of all simulated clients using a number of executable threads that is optimally equal to the number of processors. For example, if a single processor is used, one executable software thread is provided for initiating all I/O requests, while a second executable software thread is used to receive all I/O response data. A system having, for example, three processors will optimally use three executable threads for generating I/O requests and three executable threads for receiving I/O response data.

The stress test of the present invention is not limited by the number of executable threads that is supported by the operating system that is used. The present invention is enabled by completion port or similar technology, which allows all I/O requests to be initiated by executing one thread, the send data thread, on each processor, and which further allows all I/O response data to be received by executing another thread, the receive data thread, on each processor.

A completion port is a software object supported by Microsoft Windows NT operating system software version 3.5 and later that monitors the status of a plurality of overlapped or copending I/O requests to detect completion of one of the I/O requests. The completion port associates a parameter with the completed I/O request that it detects. The parameter is then used by the system of the present invention to identify the simulated client on whose behalf the completed I/O request has been initiated. As a result, the receive data thread can respond to the completed I/O request on behalf of the appropriate simulated client. Accordingly, instead of each simulated client needing its own dedicated client thread, use of completion port technology as described herein allows one receive data thread to service all simulated clients. However, the invention is not limited to completion port technology. Instead, the invention extends, for example, to any similar routine, program, object, component, or the like that can notify a receive data thread of completion of one of multiple copending I/O requests.

According to a method of conducting the stress test under the invention, a client simulator computer configured to support completion ports or similar technology is connected to the server that is to be tested. The client simulator has stored therein client profiles associated with clients to be simulated. State variables contained in the client profiles are updated as needed to reflect the server's ongoing responses to the I/O requests of the associated simulated clients. Each client profile also assigns a usage profile to a simulated client. For example, a usage profile may include a predetermined frequency with which the associated simulated client is to initiate I/O requests. The usage profile may also specify the types of I/O requests that the simulated client can initiate. The client profile further includes a set of state transition rules that correspond to each of the possible states in which a simulated client may be. The rules define the range of possible I/O requests associated with the various states and the basic behavior of the simulated clients. The elements of the client profile are provided such that the actions of the simulated clients closely resemble activity initiated by actual clients on a network.

The stress test is conducted as the send data thread selects one of the simulated clients. The send data thread reads the state of the simulated client from a simulated client state array. In response to the state that is thereby read, the send data thread selects an appropriate I/O request for the selected simulated client by reading and applying the state transition rules and the usage profile. The send data thread then initiates the I/O request that has been selected and sends the I/O request to an associated socket.

The I/O request is transmitted from a socket to the server by means of network communication infrastructure. Meanwhile, the send data thread can wait a specified delay interval before again selecting the next simulated client. The send data thread repeats the cycle for the newly selected simulated client. Accordingly, the send data thread initiates multiple I/O requests in series. The specified delay interval is generally selected such that the frequency at which the send data thread initiates I/O requests closely resembles the frequency for which the server may receive requests during actual use.

The server processes the I/O requests initiated by the send data thread. The method of stress testing is such that from the standpoint of the server, the incoming I/O requests are essentially indistinguishable from those of actual clients. The server transmits I/O response data associated with completed I/O requests back to the sockets, which is subsequently passed on to one of a plurality of client data buffers. During this process, a completion port continuously monitors the sockets for a completed I/O requests. Each time such a completed I/O request is detected, the completion port notifies a receive data thread of the completion. The notification includes a parameter that the receive data thread uses to associate the completed I/O request with the appropriate simulated client.

Is The notification from the completion port signals the receive data thread to read the I/O response data contained in the client data buffer associated with the appropriate simulated client. The receive data thread determines whether the completed I/O request indicates that the state of the simulated client should be changed. If the state should be changed, the receive data thread updates the value of the associated state variable in the client profile to represent the new state.

The invention typically also includes structure and steps for monitoring the performance of the server. This may be accomplished in one of at least two ways. First the method may include measuring the elapsed time between initiation of a specified I/O request and completion thereof by the server. This process can be extended to identify response times for any or all I/O requests. The maximum response time for any request may be measured and an average response time can be calculated. Second, the completion frequency at which the server successfully completes I/O requests can be measured. The completion frequency may be compared with the initiation frequency, or the rate at which the server receives I/O requests. A completion frequency that is regularly less than the initiation frequency would suggest that the server tends to accumulate an I/O backlog and cannot keep up with demand or that an inordinate number of I/O requests are unsuccessful.

It will be appreciated that the present inventive method overcomes the limitations in the prior art. The stress test of the present invention is not inherently limited to a maximum number of clients because only one thread per processor is needed to initiate requests on behalf of all clients. Moreover, response time for the stress testing application is improved because the client simulator computer does not need to allocate large amounts of processing power to context switching between many executable threads. The present invention is a great improvement in the prior art since context switching in single processor systems is conducted only between the send data thread and the receive data thread.

The present invention is able to simulate a wide variety of client actions. The methods are sufficiently flexible to simulate clients of a large range of servers. The stress test may be modified to correspond to differing levels of usage, numbers of clients, and types of I/O requests.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for simulating multiple clients for stress testing a network server. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
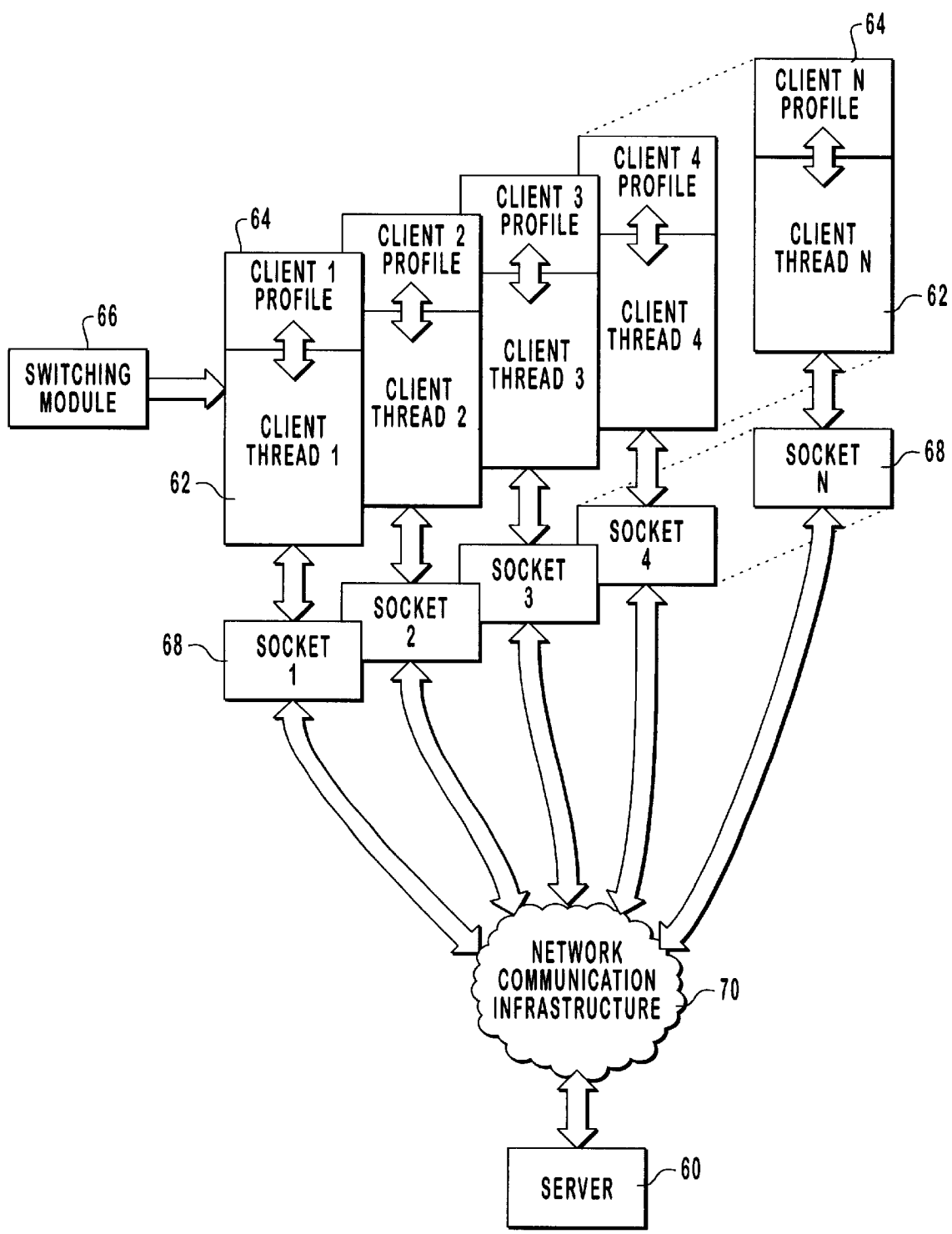
FIG. 1 is a block diagram of selected elements of a prior art system for conducting a stress test of a server.
Figure 2:
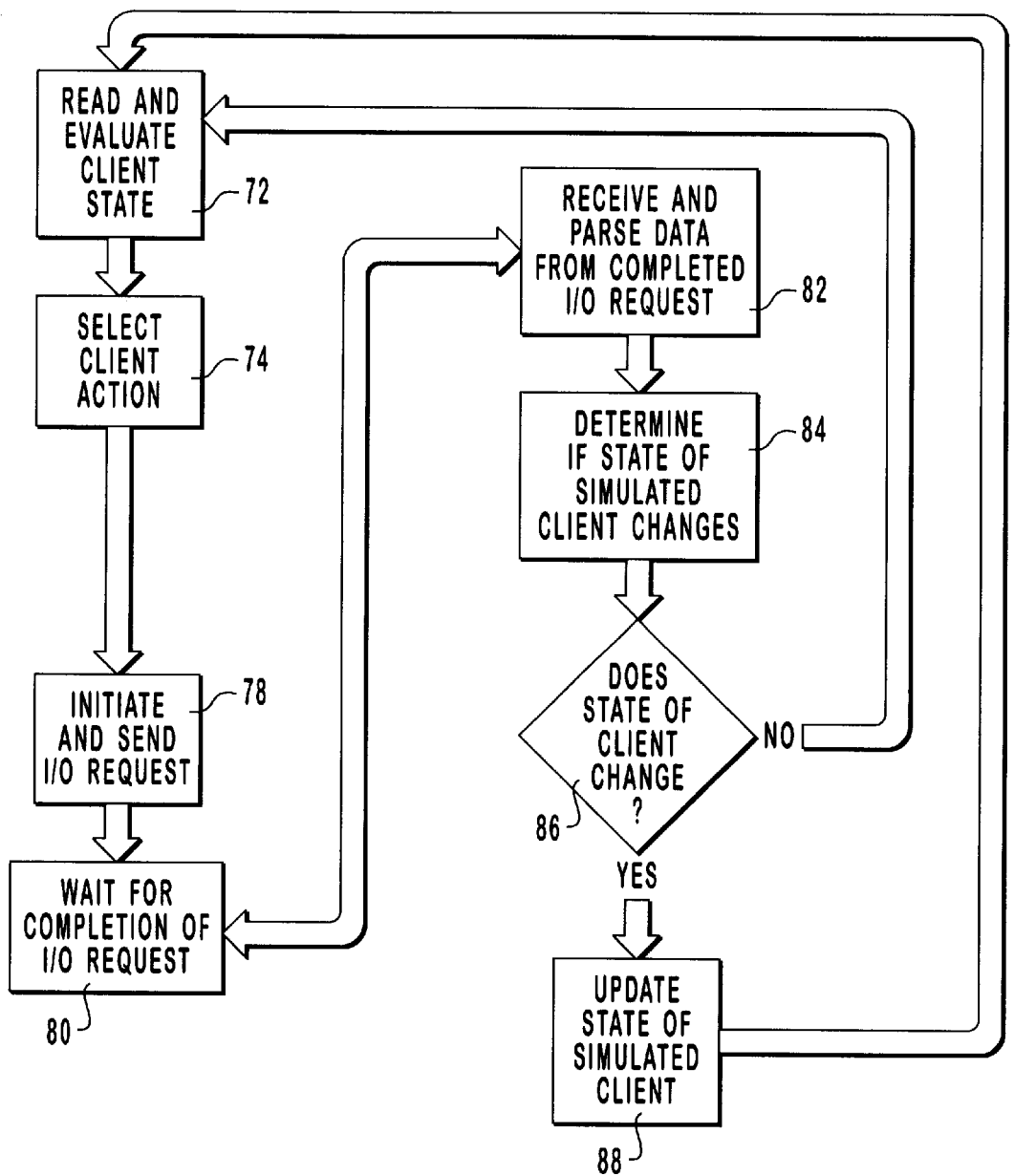
FIG. 2 is a flow chart of the prior art stress test method of FIG. 1.
Figure 3:
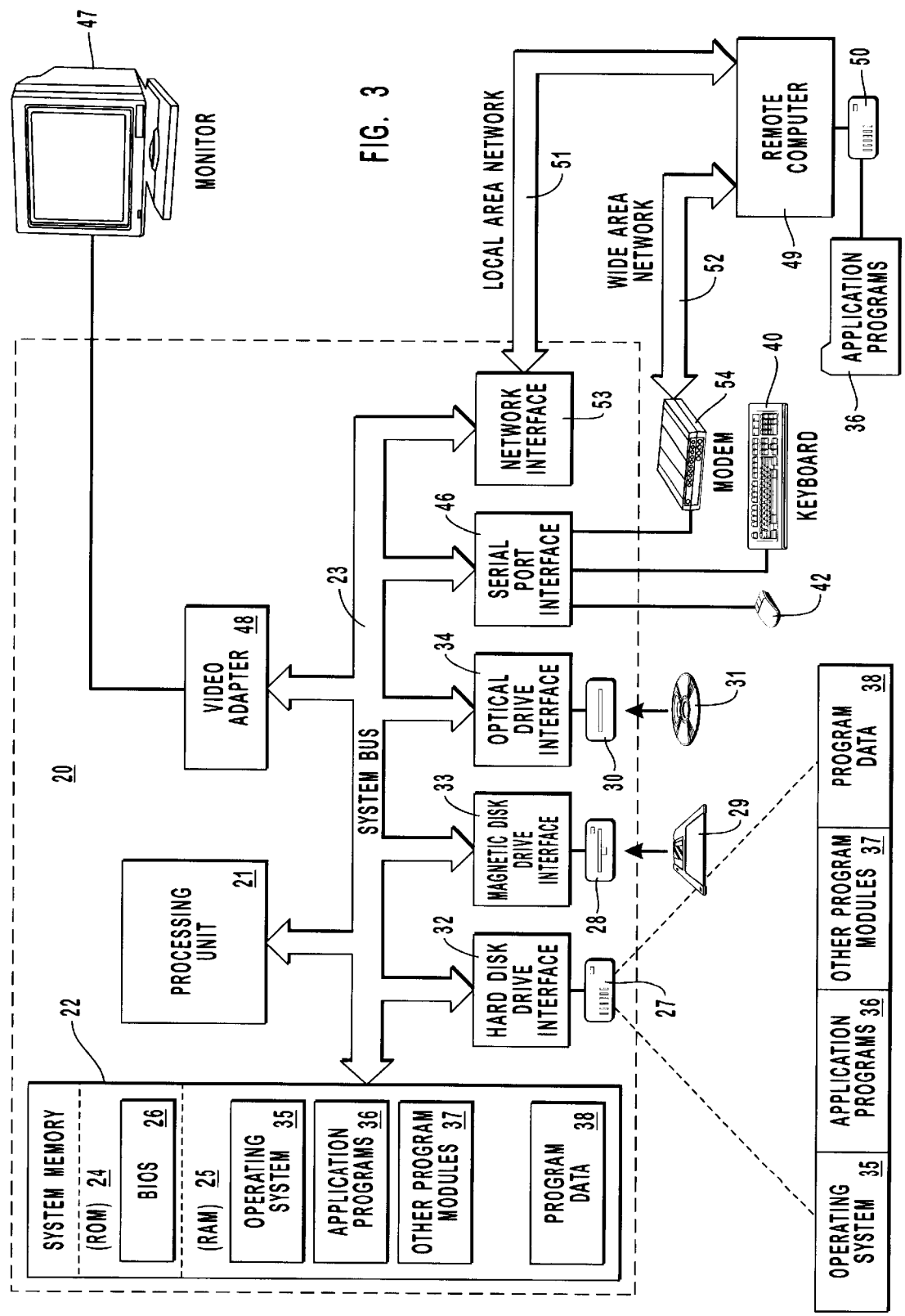
FIG. 3 is an example system that provides a suitable operating environment for the present invention.

FIG. 3 and the following discussion are intended to provide a brief, general description of a suitable computing environment in which the intention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and point device 42. Other input devices (not shown) may include a microphone, joy stick, game pad, satellite dish, scanner, or the like. These and other input devices are often connected to the processing unit 21 though a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 3. The logical connections depicted in FIG. 3 include a local area network (LAN) 51 and a wide area network (WAN) 52 that are presented here by way of example and not limitation. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be sorted in the remote memory storage device. It will be appreciated that the network connections shown are exemplary and other means of establishing a communications link between the computers may be used.

As used herein, "simulated client" includes any network user, computer, or network-accessible device that is modeled by the stress test of the present invention. A simulated client is defined in part by an associated client profile that includes, for example, a set of possible states of the simulated client, state transition rules that specify possible I/O requests to a server from the simulated client in any of the possible states and a relative frequency of each of the possible I/O requests. As the client simulator computer initiates I/O requests on behalf of the simulated client in accordance with the client profile, the simulated client is, in effect, a virtual network user or device whose actions simulate those of an actual client as reasonably closely as desired.

The term "state" is used herein to describe the relationship of the simulated client with respect to the elements of the system of the invention that include, but are not limited to, the server, the client simulator computer, stored data, and the computer code of the stress test application. A simulated client in a specified state is authorized and constrained to interact with the elements of the system in a predetermined manner. The state of a simulated client corresponds to the various levels of access to a server and authorization to execute I/O requests that are experienced by actual users. For example, an actual user may be logged-off, logged-on, or have specific access to certain files on a server. Likewise, analogous states may be assigned to a simulated client to define the level of authorization and access of the simulated client. Typically, the state of any simulated client is subject to change during execution of the method of the present invention as the relationship between the simulated client and other elements of the system change. The state of a simulated client is ordinarily tracked using one or more state variables stored within a computer-readable medium. The term "state transition rules" as used herein refers to the set of logical relationships that define the actions that the system may execute on behalf of a simulated client. For example, state transition rules may define the range of possible I/O requests that can be initiated for a simulated client in a specified state. The state transition rules may also include instructions defining the relative probability with which each of the possible I/O requests are to be selected and initiated. State transition rules are adaptable such that any number or type of clients and their actions may be simulated.

As used herein, "I/O request" includes data transmissions made from the client simulator computer to the server. "I/O request" encompasses both data transmissions that ordinarily result in a response by the server based on the content of the data transmission and those that do not result in a response by the server. Accordingly, "I/O request" extends to all data transmissions that may be made by the client simulator computer to the server on behalf of one or more simulated clients.

The method and system of the invention provide a client simulator computer wherein I/O requests are initiated by one executable thread per processor on behalf of all simulated clients. This executable thread, or the send data thread, directs I/O requests to a server where responses thereto are generated. The server services an I/O request and returns I/O response data to the client simulator computer. A completion port or a similar object detects a completed I/O request and notifies a receive data thread configured to receive I/O response data on behalf of the simulated clients. Optimally, one receive data thread is executed on each processor, although a different number may be used if desired. The receive data thread parses the I/O response data and updates the state of one or more simulated clients as needed according to the I/O response data.

In order to clearly disclose the elements, operation, and function of the invention, the detailed description provided herein is directed primarily to a stress test system utilizing one processor. Accordingly, reference is made to one send data thread and one receive data thread. It should be understood, however, that the present invention is completely operational using multiple processors. Using more than one processor further increases the simulating capacity and speed of the stress test system. What is taught herein may be scaled to multiple processors in ways that will be understood by persons of ordinary skill in the art. When more than one processor is used in the stress test system, the number of send data threads and the number of receive data threads are optimally equal to the number of processors, with one send data thread and one receive data thread being allocated to each processor. In addition, one completion port is generally used per active processor.

Providing one send data thread and one receive data thread for each processor of the stress testing system minimizes context switching and maximizes the amount of system resources that are dedicated to client simulation. However, the invention should also be understood to extend to systems in which a small number of send data threads and a small number of receive data threads are used per processor. In particular, the invention extends to systems in which the number of simulated clients is greater, and preferably significantly greater, than the number of send data threads. In any event, the number of send data threads and the number of receive data threads are preferably quite small relative to the number of clients that are simulated, especially when there are very large numbers of simulated clients.

Figure 4:
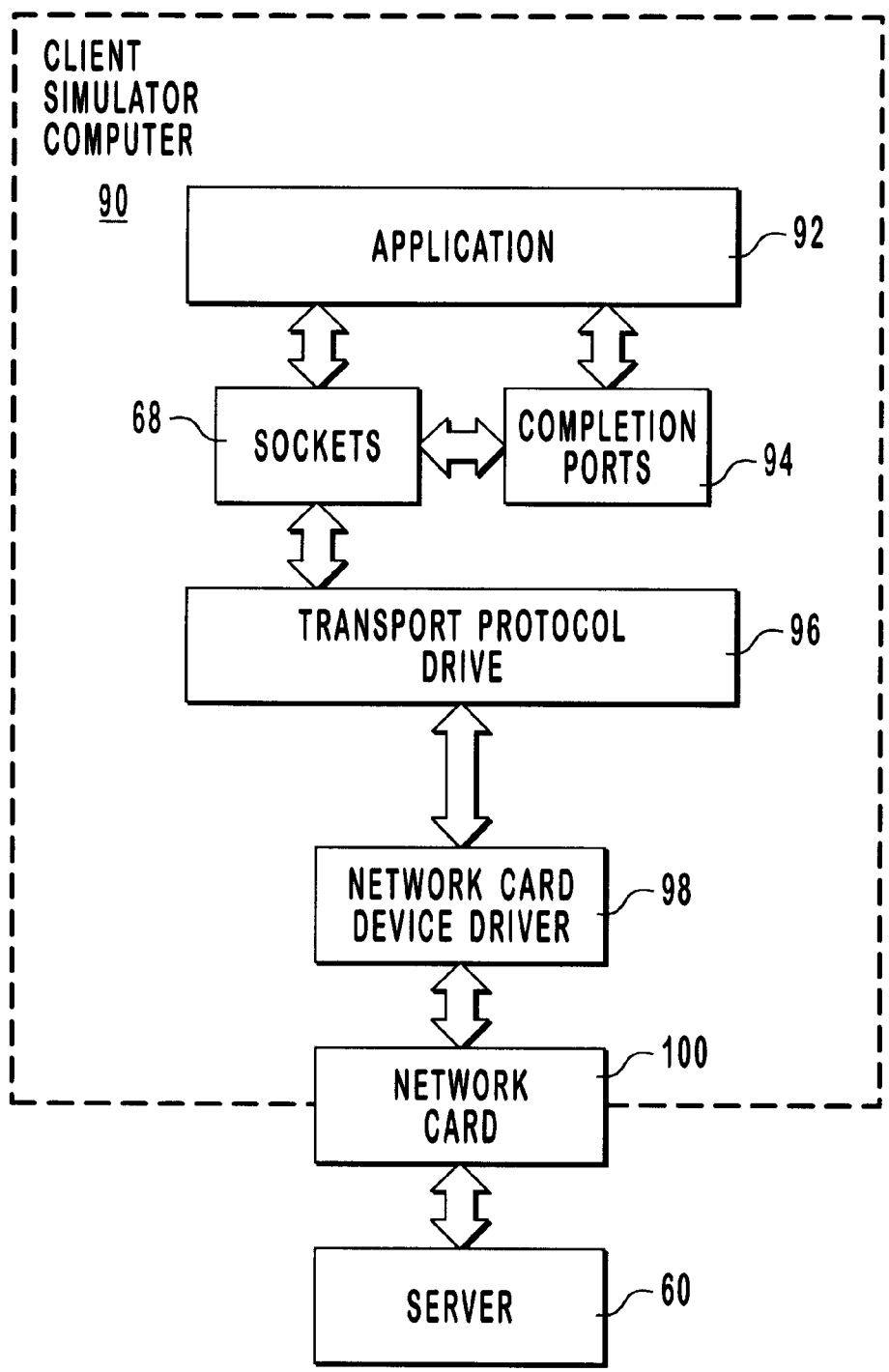
FIG. 4 is a block diagram showing a hardware, software, and network environment in which a stress test of the invention may be conducted.

Referring to FIG. 4, a client simulator computer 90 is provided, and may be the computer 20 of FIG. 3. Stress test application 92 is installed on or otherwise accessed by client simulator computer 90. For reference, stress test application 92 may correspond to application program 36 illustrated in FIG. 3. Sockets 68 and completion ports 94 are initiated in client simulator computer 90 during operation of stress test application 92. Sockets 68 provide a conduit or interface through which information is transmitted and received by stress test application 92. Completion ports are software objects supported by certain operating systems such as Microsoft Windows NT versions 3.5 and later. Completion ports 94 monitor sockets 68 to detect completion of an executable event, such as completion of an I/O request. In turn, completion ports 94 transmit notification of the completed event to stress test application 92. The function of completion ports 94 will be disclosed in greater detail below.

Client simulator computer 90 also includes a transport protocol driver 96 to facilitate communication between the network environment and the host computer and any applications therein, such as stress test application 92. Network card device driver 98 and network card 100 provide a direct interface between the network environment, which includes server 60, and internal elements of client simulator computer 90. For reference, network interface 53 of FIG. 3 corresponds to transport protocol driver 96, network card device driver 98, and network card 100 of FIG. 4. If stress testing is to be performed over a wide area network, such as wide area network 52 of FIG. 3, then the mechanism used in FIG. 3 to interface with wide area network 52 may be used.

Figure 5:
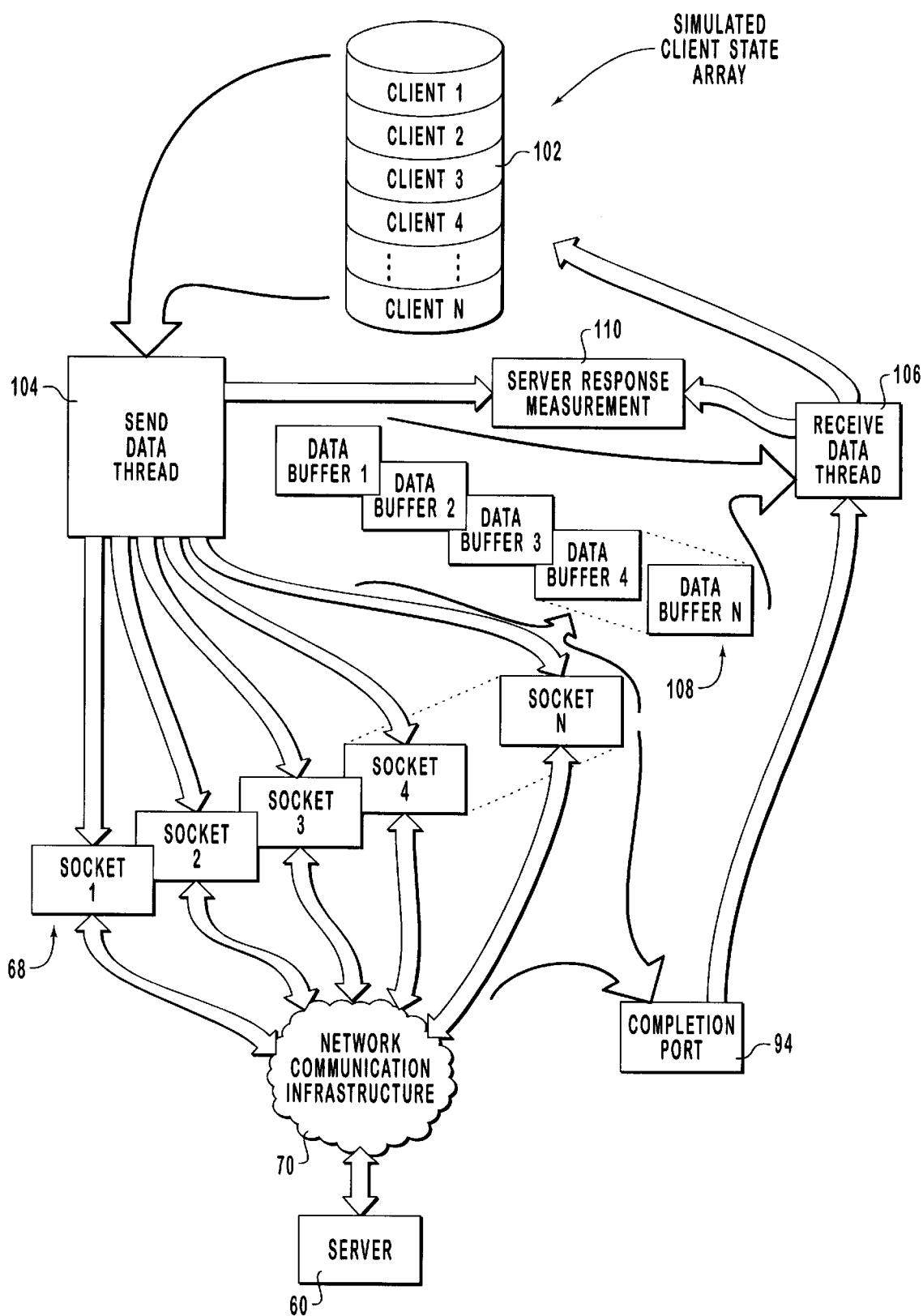
FIG. 5 is a block diagram of selected elements of the system of the present invention for conducting a stress test of a server.

FIG. 5 depicts the elements of the system for conducting a stress test of a server according to the invention. The system includes means for storing a plurality of simulated client profiles each representing an associated simulated client. As an example of such means, FIG. 5 shows a simulated client state array 102 that has stored therein the states of each of a plurality of simulated clients. The means for storing simulated client profiles may also include, for example, a storage area for storing state transition rules for the simulated clients. Such a storage area is illustrated as state transition rules storage element 118 of FIG. 6.

Send data thread 104 is used to select and initiate I/O responses for all of the simulated clients. Accordingly, send data thread 104 is presented as but one example of a means for sending I/O requests on behalf of all of said simulated clients. Send data thread 104 is preferably an executable software thread that runs on a processor of the simulated client computer. Only one software thread generally may be executed by a processor at any one time. The features and function of send data thread 104 will be disclosed in greater detail below in reference to FIG. 6.

Each simulated client has a socket 68 initiated within the client simulator computer. Sockets 68 facilitate communication between the stress test application and the network environment. Sockets 68 receive I/O requests that are sent from send data thread 104 and transmit the I/O requests into the network environment. Network communication infrastructure 70 routes the I/O requests to server 60. During operation, server 60 may receive up to several hundred or more I/O requests per second, depending on the server and level of activity that is to be tested. Server 60 processes the I/O requests as it would process I/O requests from actual clients. As individual I/O requests are completed and server 60 generates responses thereto, I/O response data is transmitted back to sockets 68 according to conventional processes. Upon receiving a response to a completed I/O request, sockets 68 transmit I/O response data to a client data buffer 108 that is associated with the simulated client whose request has been completed.

As I/O requests are completed and as responses are generated, means for monitoring the completion status of all initiated I/O requests is activated. Completion port 94 is an example of such means for monitoring. Completion ports are supported by Microsoft Windows NT operating system software version 3.5 and later to detect completion of one of a number of overlapped I/O requests. According to the present invention, a completion port 94 is initiated and associated with sockets 68. Upon detecting a completed I/O request, completion port 94 sends notification thereof to receive data thread 106. The notification includes a parameter associated with the event that receive data thread 106 interprets so as to identify the simulated client on whose behalf the completed I/O request was initiated.

This process of detecting a completed I/O request and identifying the associated client allows one receive data thread 106 to respond to the completed I/O requests on behalf of all clients. It should be noted that the present invention is not limited to use with client simulator computers which utilize completion port technology. Instead, there will be other systems which can provide similar notification of completion of I/O requests, and such systems are contemplated by the invention.

Upon determining the identity of the associated simulated client, receive data thread 106 determines whether the completed I/O request indicates that the state of one or more clients should be updated. If so, receive data thread 106 accesses the corresponding state variable in simulated client state array 102 and updates the value thereof such that it represents the new state. The features and function of receive data thread will be disclosed in greater detail below in reference to FIG. 8.

Typically, the invention includes steps and elements for testing the efficiency of the server's response. This may be accomplished in any desired manner. For example, FIG. 5 shows a server response measurement element 110 that monitors the response of the server. In one alternative embodiment, server response measurement element 110 is an example of a means for measuring a response time for I/O requests. According to this method of measuring server response, response time is defined as the duration of time that elapses between initiating an I/O request and receiving notification of completion of the I/O request. Of course, this process can be extended to measuring response times for any or all of the initiated I/O requests. The maximum response time for any request may thereby be measured and an average response time can be calculated. Conceptually, measuring the response time for an I/O request views the server's efficiency from the standpoint of the simulated clients.

Another alternative for measuring server efficiency with server response measurement element 110 is to measure the completion frequency, which is the rate at which the server successfully completes I/O requests. The completion frequency may be compared with the initiation frequency, or the rate at which the server receives I/O requests. A completion frequency that is regularly less than the initiation frequency would suggest that the server tends to accumulate an I/O backlog and cannot keep up with demand or that an inordinate number of I/O requests are unsuccessful. Monitoring the completion frequency measures response from the standpoint of the server.

Figure 6:
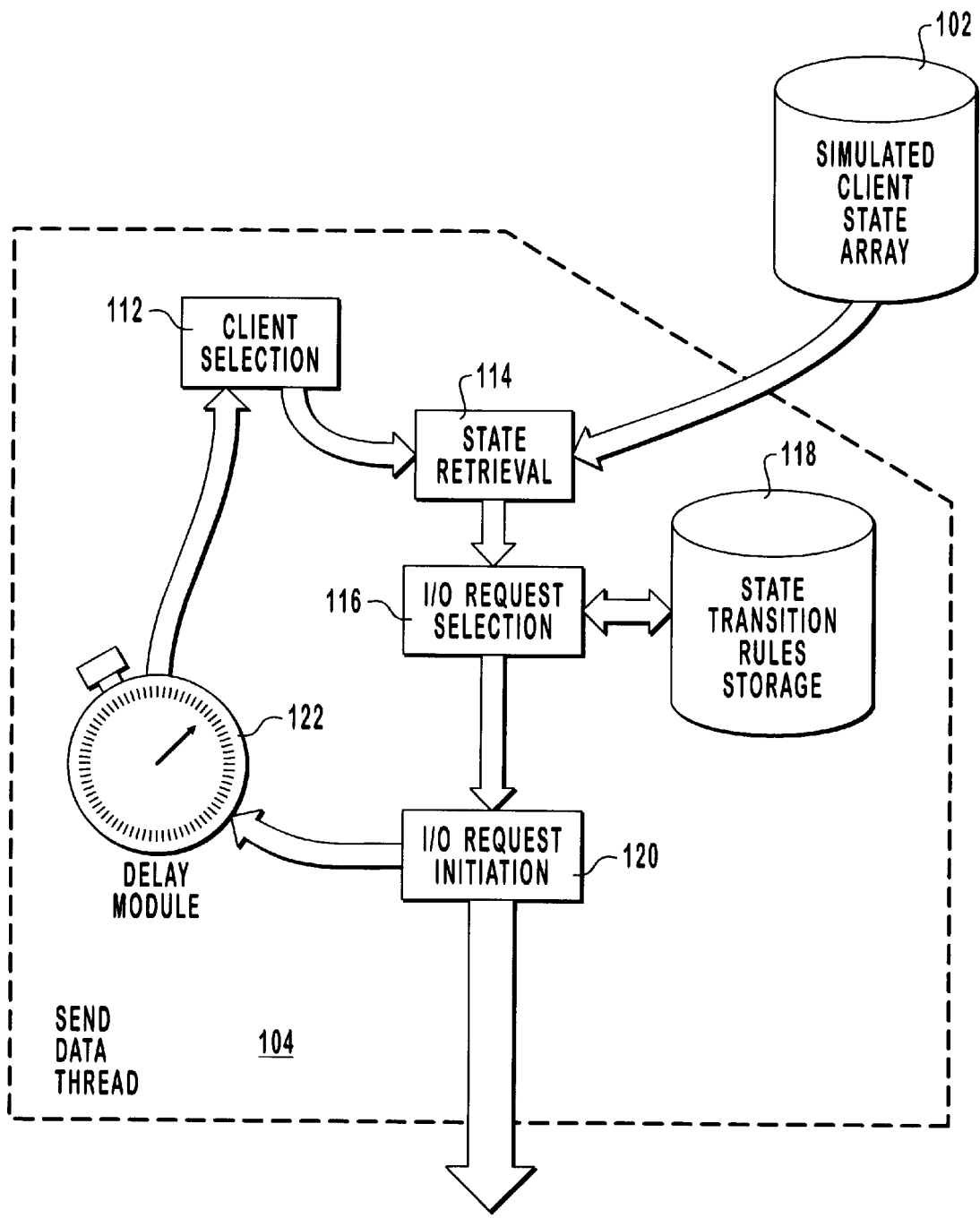
FIG. 6 is a block diagram showing elements of the send data thread of FIG. 5 to further illustrate the process of selecting and initiating I/O requests.

FIG. 6 illustrates the elements of send data thread 104 in more detail. These elements may be, for example, routines, programs, objects, components, data structures, or the like. In particular, send data thread 104 includes means for selecting a simulated client profile in order to initiate an I/O request on behalf of an associated simulated client. FIG. 6 depicts several elements which constitute but one example of such means for selecting. In particular, client selection element 112, state retrieval element 114, and I/O request selection element 116 interoperate so as to function as means for selecting a simulated client profile.

Client selection element 112 selects among the various simulated clients in a defined manner to identify one for which an I/O request is to be initiated. Accordingly, client selection element 112 is an example of means for specifying a simulated client. Selection of a simulated client may be random, done according to a predetermined frequency, done so as to select the simulated client that has been idle for the longest time, or in any other desired manner. In any event, client selection element 112 is provided and configured to model behavior of actual clients in a manner as sophisticated or simple as desired. In some applications under the invention, a complex selection routine may need to be provided for client selection element 112, while in other applications, a random or consecutive selection order will suffice.

After selecting a simulated client, client selection element 112 shares data identifying the selected client with state retrieval element 114. Upon receiving the identifying data, state retrieval element 114 reads information in simulated client state array 102 to retrieve the state of the selected simulated client. In its most simple form, simulated client state array 102 comprises an array of state variables, wherein the value of each variable corresponds to one of a number of possible states. State retrieval element 114 is configured in such a manner so as to identify the state variable among the array that corresponds to the selected simulated client. State retrieval element 114 shares information related to the identity of selected simulated client and the state of the client with means for reading state transition rules to select an I/O request to be initiated. By way of example, and not by limitation, such means may be I/O request selection element 116.

I/O request selection element 116 has access to means for storing state transition rules, which contains information relating to the range of permissible I/O operations that are associated with each of the various possible states. An example of such means is shown as state transition rules storage element 118. In addition to storing state transition rules, storage element 118 may also include part of the client profile for each of the simulated clients. In particular, storage element 118 may provide relative frequency rules defining the proportional frequency at which any given simulated client executes each of the possible I/O requests. For example, the relative frequency rules may provide that a certain simulated client will initiate talk requests 65% of the time, whisper requests 10% of the time, part channel requests 5% of the time, and will make no I/O request, or "do nothing", 20% of the time while the simulated client is in an "in-channel" state. Of course, the frequency rules for the various simulated clients may be as detailed or simple as desired. Furthermore, frequency rules and state transition rules may be stored on a per-client basis, may be stored for a group of clients, or some combination of the two. The important point is to provide frequency rules and state transition rules that adequately model the activity of actual clients such that the server is required to respond in a manner similar to that of actual network use. Accordingly, I/O request selection element 116 identifies an I/O request to be initiated on behalf of the selected simulated client.

Send data thread 104 also has means for initiating an I/O request to the server in order to simulate a client action. An example of such means for initiating is shown as I/O request initiation element 120. After selection of the I/O request, I/O request initiation element 120 is executed so that the appropriate I/O request is sent to a socket 68 and into the network environment.

When the I/O request is initiated, means for delaying is activated, such that a selected amount of time elapses before send data thread 104 initiates a subsequent I/O request. Send data thread 104 may include delay module 122, which is but one example of such means for delaying, to ensure that send data thread 104 does not initiate a series of I/O requests in too short a period. For example, if the stress test of the present invention is used to model activity of 1,000 simulated clients, and it is decided that an average client will initiate an I/O request every 30 seconds, delay module 122 should be set to delay the send data thread routine to repeat, on average, once every 30 milliseconds. In some applications of the invention, it may be adequate to have delay module 122 delay repetition of the send data thread routine at a fixed delay interval. In many stress test situations, a regular delay interval will provide a specified volume and frequency of I/O requests to adequately simulate client activity.

In some applications, it may be desirable for delay module 122 to provide a more sophisticated, variable delay interval. A variable delay interval reflects the observation that most clients do not execute I/O requests at regular intervals. In practice, incoming I/O request traffic from multiple concurrent clients is irregular, if not random. Accordingly, delay module 122 may be configured to select a delay interval according to some random distribution function that approximates real world client behavior. The use of random and pseudo-random distribution functions to approximate real world behavior is known in the art.

Figure 7:
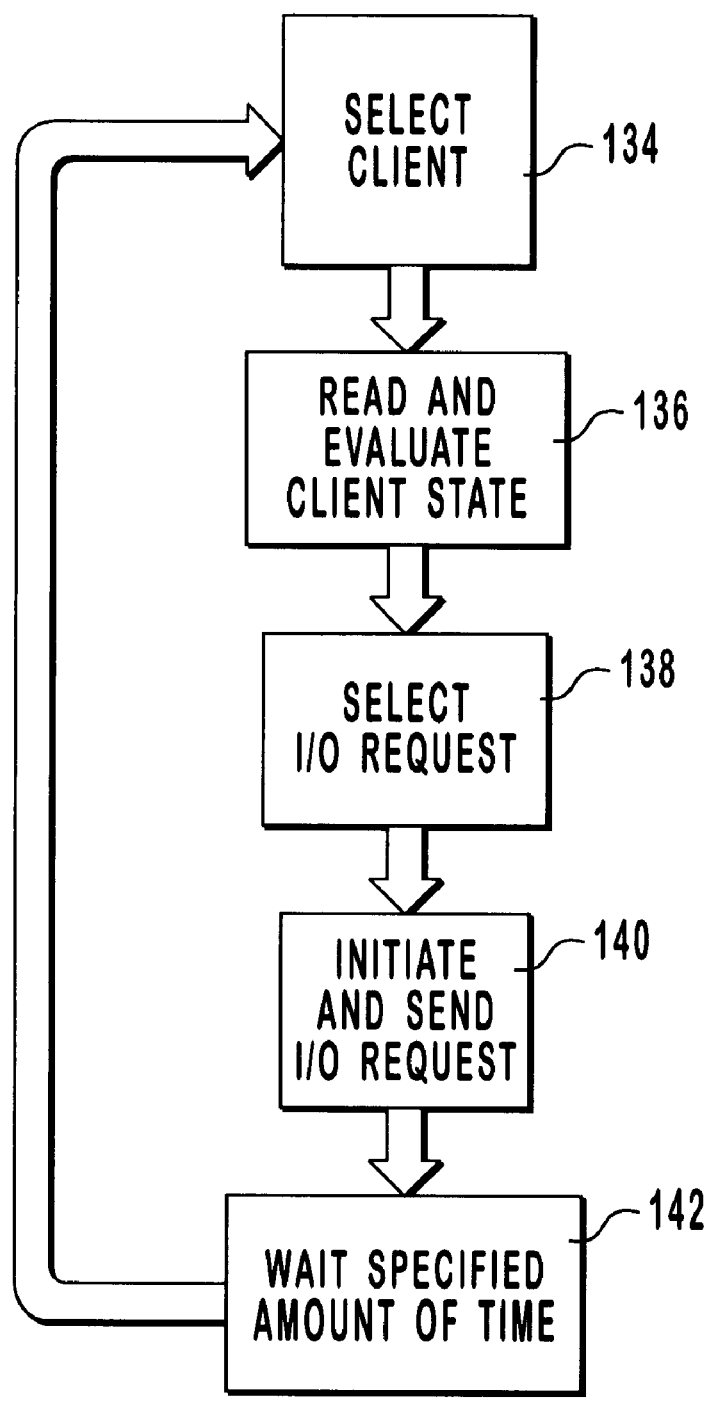
FIG. 7 is a flow chart showing the steps executed by the send data thread of FIG. 6.

FIG. 7 summarizes in flow chart form the steps that send data thread 104 preferably executes. The send data thread routine begins with step 134, in which a simulated client is selected. Next, step 136 is executed, in which the state of the selected client is read from the client profile and evaluated. An I/O request is selected in response to the client state and other information contained in the client profile according to step 138. Subsequently, the selected I/O request is initiated in step 140 and sent such that it eventually is accepted into the server. Finally, a specified amount of time elapses in step 142 before the routine of FIG. 7 returns to step 134.

Figure 8:
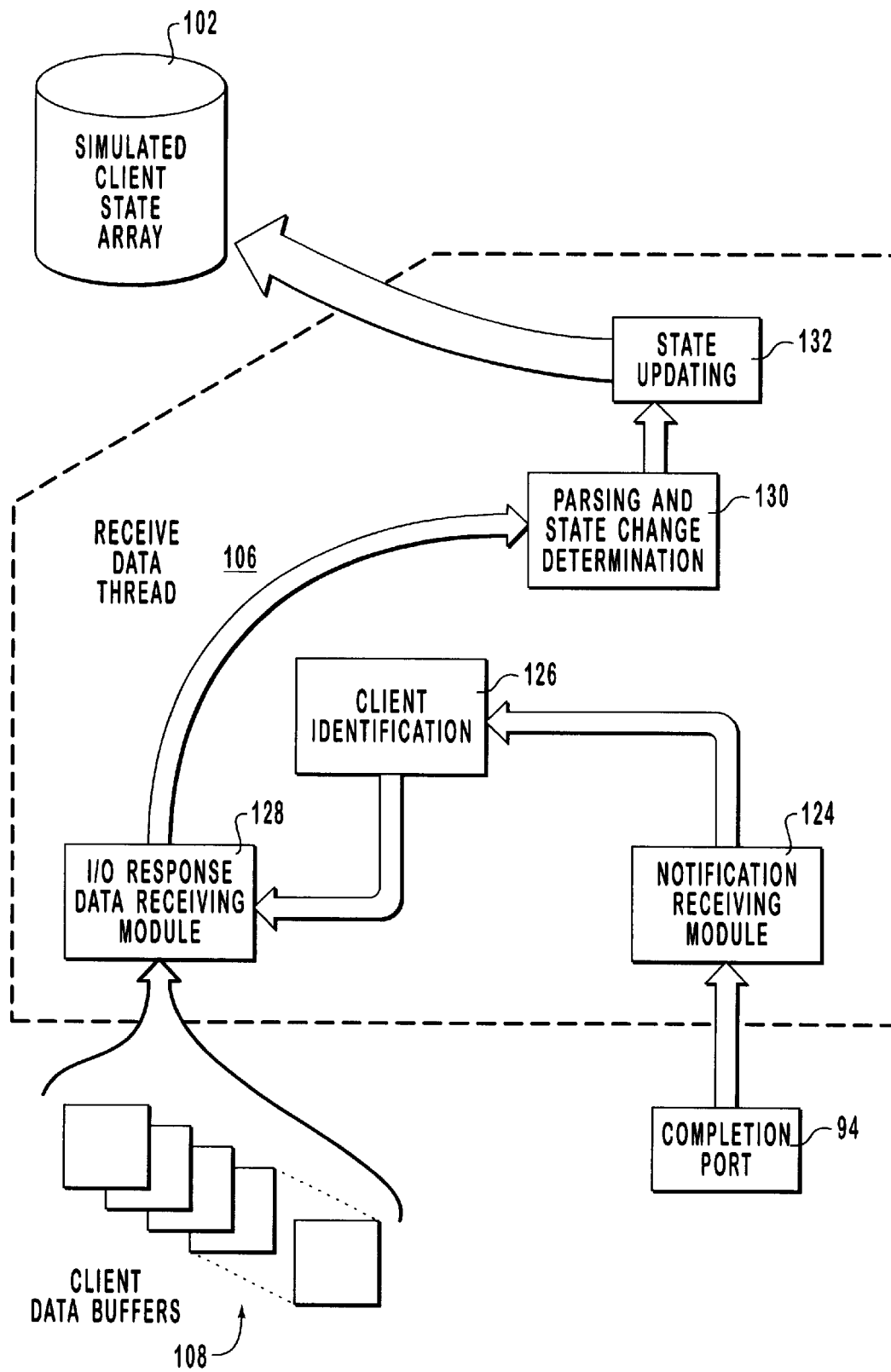
FIG. 8 is a block diagram showing elements of the receive data thread of FIG. 5 to further illustrate the method of receiving notification of completed I/O requests and of updating the states of the simulated clients.

Turning now to FIG. 8, the elements of receive data thread 106 are further shown. These elements may be, for example, routines, programs, objects, components, data structures, or the like. Receive data thread 106 is disclosed by way of example, and not by limitation, of means for receiving completed I/O requests on behalf of all simulated clients. In particular, notification receiving module 124 is provided and configured to receive notification of a completed I/O request, including any parameters that are used to identify the associated simulated client. As such, notification receiving module 124 is an example of means for receiving notification of a completed I/O request. After notification of a completed I/O request is received, means for identifying the simulated client associated with the completed I/O request is activated. As but one example of such means, client identification element 126 interprets a parameter generated by completion port 94 and identifies the simulated client on whose behalf the completed I/O request was initiated.

When the associated simulated client is identified, I/O response data receiving module 128 accesses the appropriate client data buffer 108 and receives I/O response data generated by server 60. Next, parsing and state change determination element 130 receives the I/O response data and determines whether the data indicates that a state of one or more simulated clients is to be changed. For example, parsing and state change determination element 130 may determine that the server has accepted a logon request and that the state of the associated simulated client should be changed to a "Logged-on" state. If the I/O request has failed, or it the response to the I/O request does not require a state change, parsing and state change determination element 130 responds accordingly. Thus, parsing and state change determination element 130 is one example of means for determining whether the completed I/O request indicates that at least one simulated client state is to be changed.

If it is determined that a state change should occur, means for updating the simulated client state is activated. As but one example of such means, state updating element 132 responds by accessing the state variable within simulated client state array 102 that is to be changed and by replacing the previous value of the state variable with a new value that represents the new state. Thus, receive data thread 106 promptly responds to completed I/O requests and updates simulated client state array 102 as required such that send data thread 104 is provided with current states of each of the simulated clients.

Figure 9:
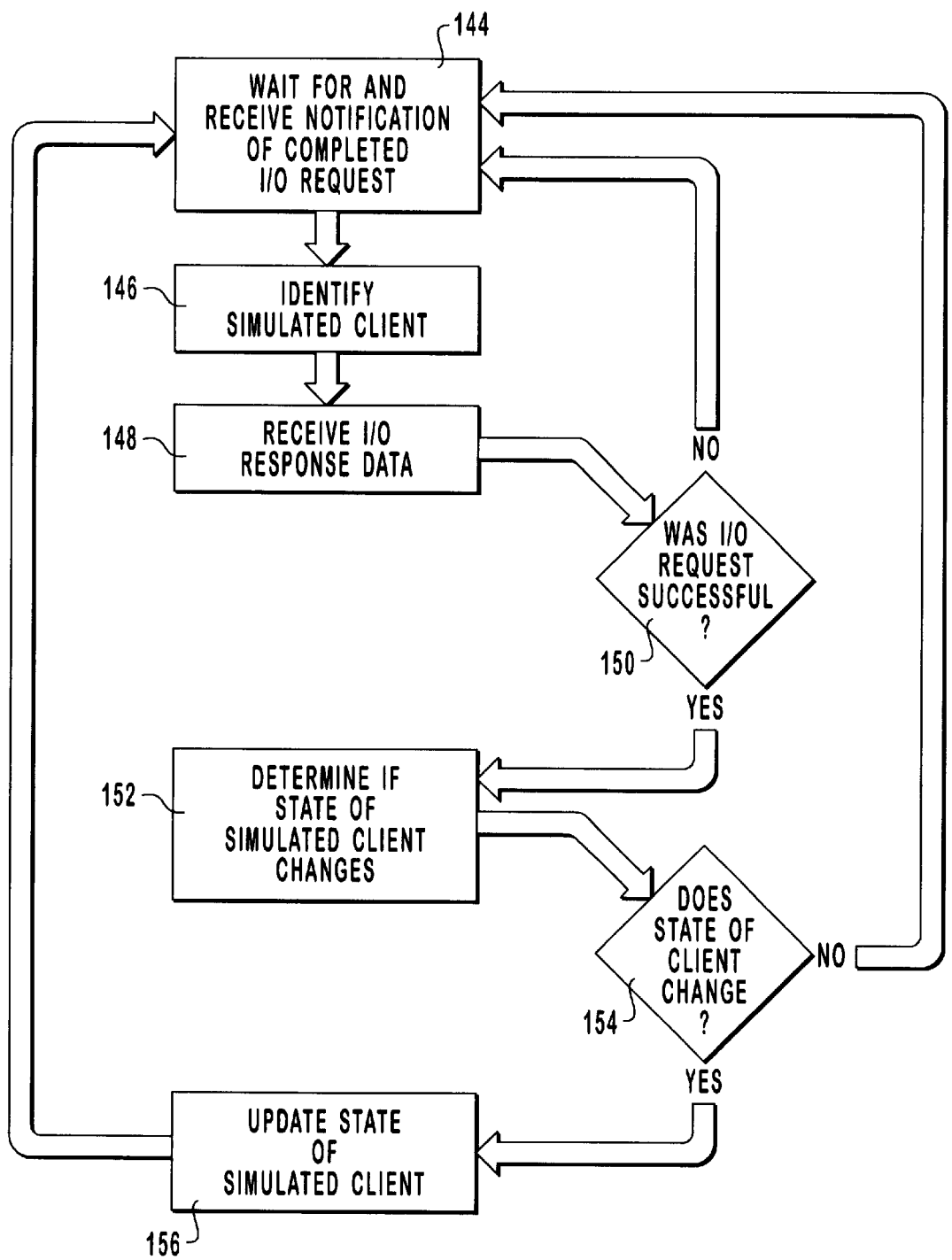
FIG. 9 is a flow chart showing the steps executed by the receive data thread of FIG. 8.

FIG. 9 summarizes in flow chart form the steps preferably executed by receive data thread 106. The routine of receive data thread 106 begins as notification of a completed I/O request is received in step 144. The simulated client associated with the completed I/O request is then identified in step 146. Next, step 148 is executed, in which I/O response data that has been generated in the completed I/O request is received. In step 150, it is determined whether the I/O request has been successful or, in other words, whether server 60 has responded in the manner sought by the I/O request. If the I/O request has not been successful, the receive data thread routine returns to step 144 and waits for notification of another completed I/O request. If the I/O request is successful, step 152 is executed, in which it is determined whether the state of the simulated client is to be changed in response to the completed I/O request. If the state of the simulated client does not change, the receive data thread routine returns, as shown in step 154, to wait for another completed I/O request. If it is determined that a state of a simulated client should be changed, the value of a state variable in simulated client state array 102 is updated according to step 156. After step 156, the receive data thread routine returns to step 144.

It will be appreciated that under stress test methods of the prior art, each dedicated client thread performs a set of functions that are divided according to the present invention between the send data thread and the receive data thread. For example, a dedicated client thread in the prior art initiates an I/O request for a specified simulated client, receives information relating to the completion of the I/O request, and updates the state of the simulated client as needed. Of course, the problem with the prior art method is that each simulated client must have its own dedicated client thread. In contrast, the method and system of the present invention utilize a completion port to allow multiple concurrent clients to be simulated using only two executable threads per processor, significantly reducing the level of switching and queuing between threads that is otherwise required.

While context switching does not limit the number of simulated clients of the stress test under the invention, there are other resource requirements that should be satisfied. For example, each simulated client generally has one dedicated socket. In one embodiment implemented on Windows NT, each socket requires as a default about 4 kilobytes of nonpageable memory from the client simulator computer. Enough memory should be provided to support the number of sockets that are needed. In addition, care should be taken to ensure that network communication infrastructure 70 is sufficient to service the multiple I/O request transmissions from a single client simulator computer, especially where the I/O requests are data-intensive, such as those involved in sending multiple data uploads to a file server.

The method and system of the present invention are applicable for testing a number of types of network servers. The client profiles selected for use in the invention may be adapted to simulate clients of many types of networks. Of course, the number of clients, the usage profiles for each of the clients, and the types of I/O requests to be made are determined based upon the activity pattern that is to be modeled. One skilled in the art will understand how to prepare the client profiles upon learning of the disclosure made herein.

As but one example, the present invention is applicable to chat servers. It is common for chat servers to experience periodic levels of very high client traffic. For example, a chat service provider may stage special events at specified times such that particularly high interest is generated among users. Well known persons may participate in and be the focus of chat sessions at scheduled times. Likewise, chat service providers may arrange for other periodic sessions in which there will be high client interest. Because client traffic at these peak times might be orders of magnitude greater than during normal operation, it can be difficult for a provider to predict how well a server will respond without conducting a stress test. Sometimes the anticipated usage is greater than the approximately 2,000 users that could be simulated according to conventional methods. Accordingly, the present invention satisfies the needs of chat server providers who desire to test the adequacy is of a server in anticipation of a peak usage event.

Figure 10:
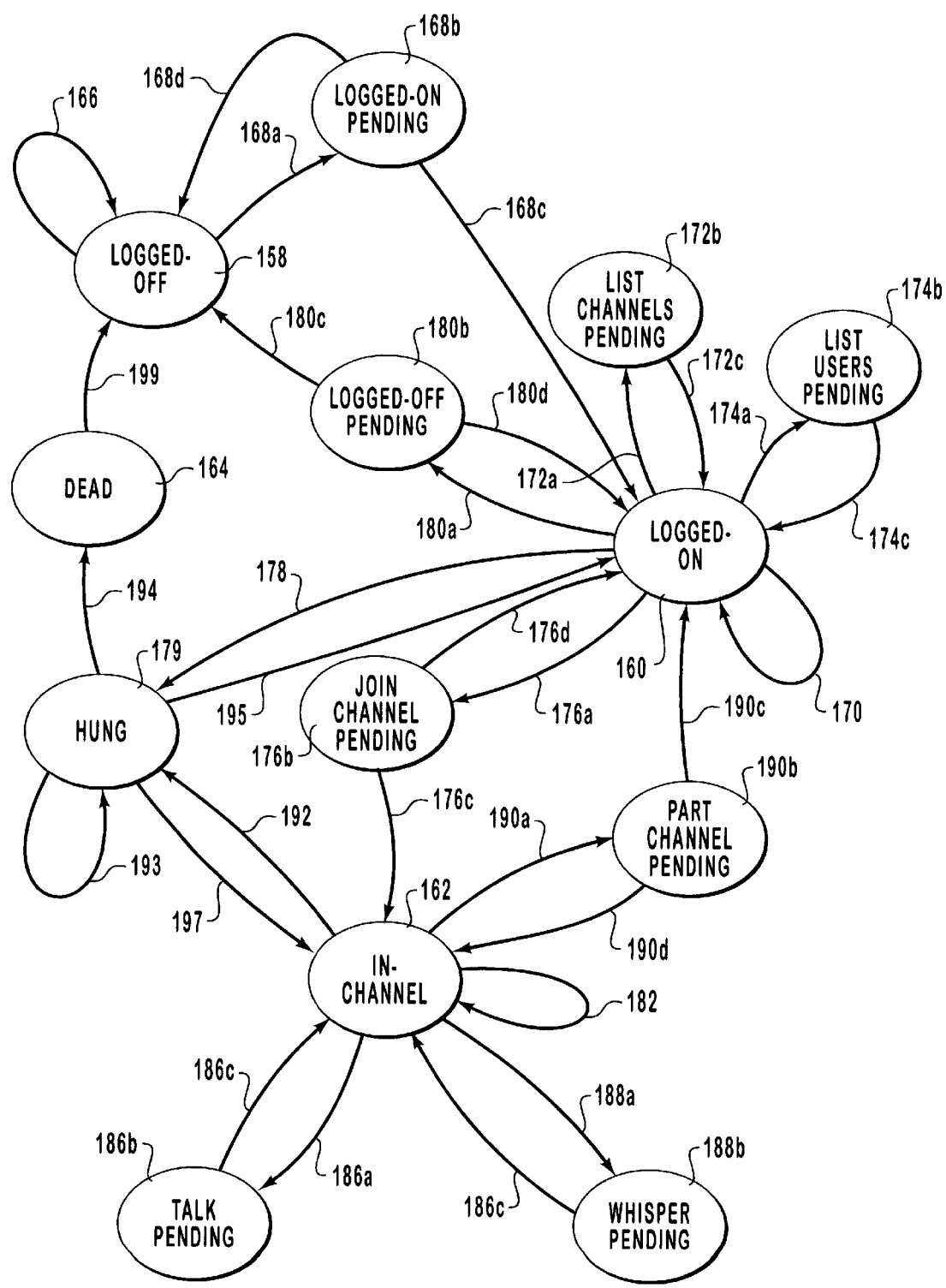
FIG. 10 is a state diagram presenting an example of states in which a simulated chat server client may reside in relation to a chat server and showing selected I/O requests that may be initiated on behalf of clients in the various states.
Figure 11:
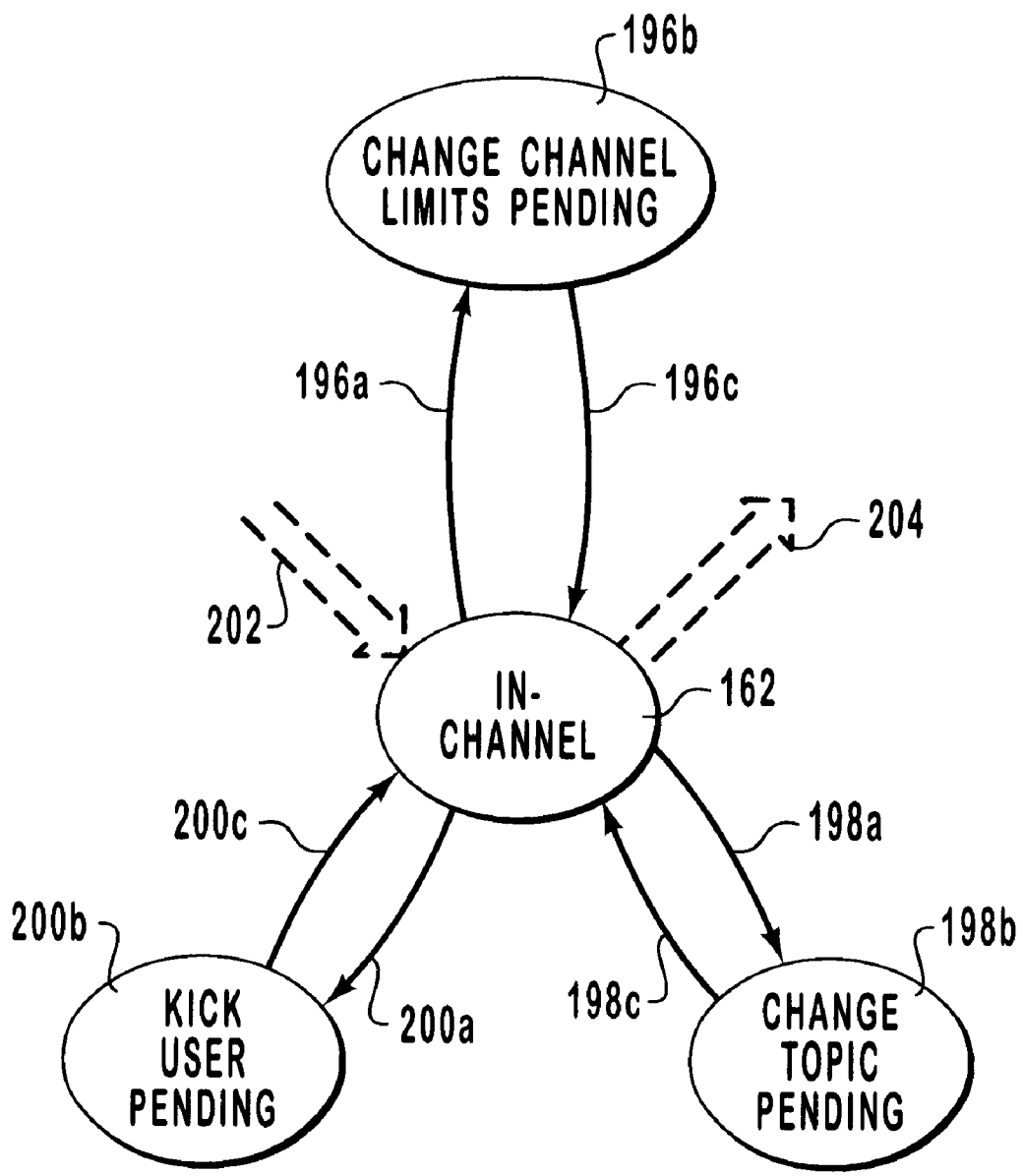
FIG. 11 is a state diagram for a simulated host client that expands on the state diagram of FIG. 10.
Figure 12:
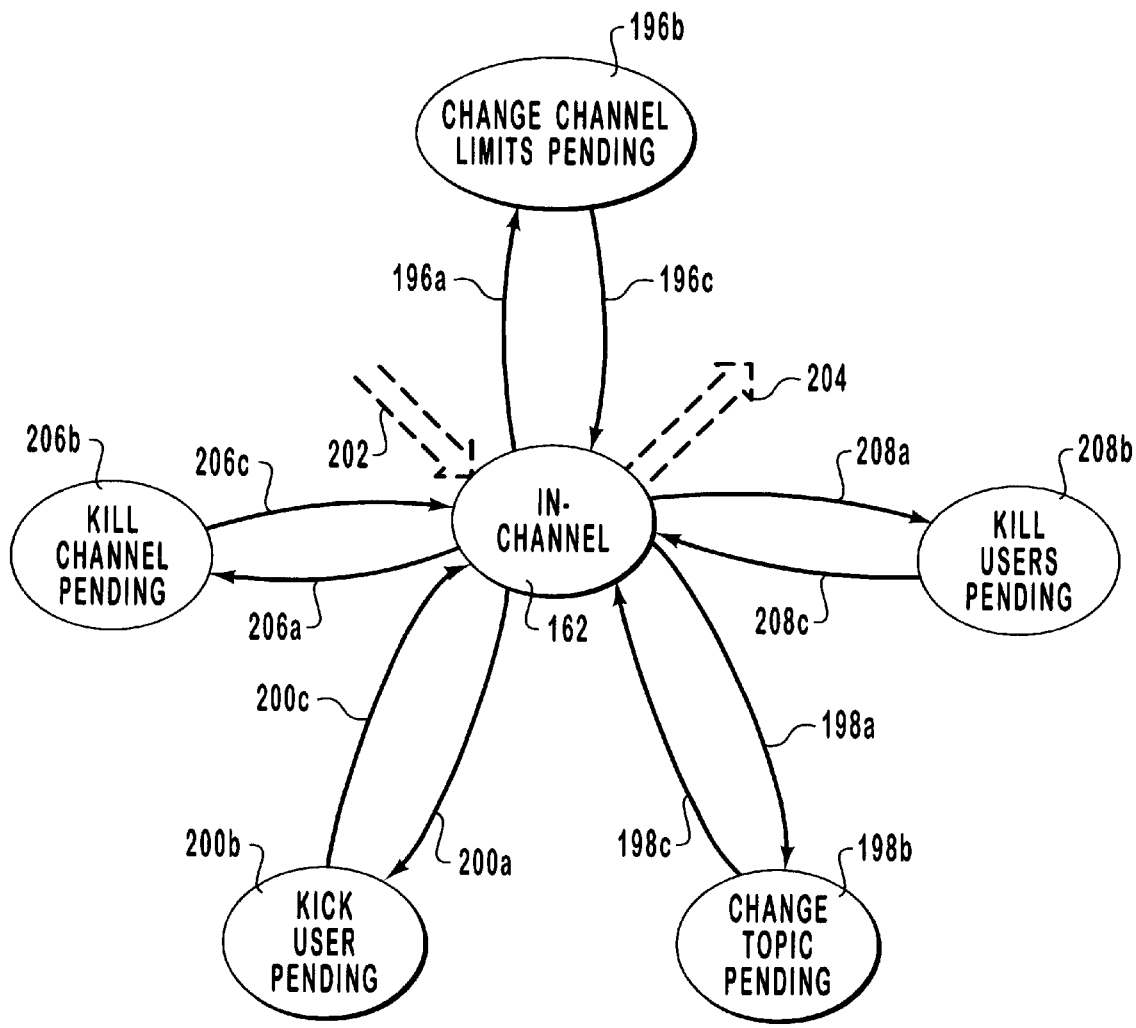
FIG. 12 is a state diagram for a simulated systems operator client that expands on the state diagram of FIG. 10.

FIGS. 10–12 present in state diagram form a set of states and associated events that might be used to simulate multiple concurrent chat server clients. It should be understood that the states and events disclosed herein are made by way of example, and not by limitation. There are several classes of clients supported by chat servers. The vast majority of clients on a chat server ordinarily are normal clients, or clients who log on to a chat session simply to participate or observe. In addition, there may be one or more host clients who facilitate discussion, guide the topic, and perhaps oversee the behavior of the normal clients. There may also be a sysop client with maximum capabilities of configuring and controlling the server on which the chat session is conducted.

FIG. 10 illustrates a typical set of states and events that can be assigned to a normal client. In FIGS. 10–12, there are shown several primary states that include logged-off state 158, logged-on state 160, in-channel state 162, dead state 164, and hung state 179. The primary states are those in which a client will be after an I/O request is initiated and fully completed. Additionally, the invention usually includes several intermediate states that are useful for flagging a simulated client that has a pending I/O request. A client in an intermediate state is prevented from initiating another request until the pending I/O request is fully completed or until a timeout period has expired. For example, a "flag" associated with the intermediate states may be generated by send data thread 104 such that send data thread 104 does not select the particular simulated client again until the flag is withdrawn. New primary states are updated in the simulated client state array 102, while intermediate states may be stored within simulated client state array 102, or within any other memory area.

For example, in FIG. 10, a normal client in logged-off state 158 is permitted to initiate a login request as illustrated by event 168a. When the send data thread selects and initiates a logon request, a flag is raised in the client profile for the selected simulated client. Accordingly, the simulated client is in logon pending state 168b. Logon pending state 168b is in effect until the login request is fully completed according to login successful event 168c or login unsuccessful event 168d. Login successful event 168c causes the simulated client to move to logged-on state 160. Login unsuccessful event 168d, which may be due to expiration of the timeout period or for some other reason, causes the simulated client to revert to logged-off state 158. The foregoing process is applicable to several I/O requests, including logon request 168a, logoff request 180a, join channel request 176a, and part channel request 190a.

Many of the intermediate pending states, however, revert to the prior primary state regardless of whether the I/O request has been successful. For example, a talk request 186a will take a simulated client from in-channel state 162 to talk pending state 186b. After the I/O request is fully completed, whether successfully or not, the simulated client returns to in-channel state 162. The foregoing process is applicable to several I/O requests, including list channels request 172a, list users request 174a, talk request 186a, and whisper request 188a of FIG. 10. Moreover, change channel limits request 196a, change topic request 198a, kick user request 200a, kill channel request 206a, and kill users request 208 of FIGS. 11 and/or 12 are conducted in the same manner.

Finally, there are some events that have no intermediate pending state. For example, do nothing 166, do nothing 170, and do nothing 182 of FIG. 10 fall into this category. There is no flag raised in reference to the simulated client who initiates the foregoing actions. Instead, the simulated client is immediately available to initiate another I/O request without having to wait for a response from the server.

The purpose of most of the states in FIGS. 10–12 will be readily apparent to one of skill in the art. However, in summary, logged-off state 158 represents a client who is not in communication with the server or who is not yet authorized to initiate I/O requests other than a logon request. Logged-on state 160 represents a client who has been authorized to communicate with the server and to make requests according to a defined set or rules. In-channel state 162 represents a client who has logged in and has been admitted into a chat room or channel. Such a client is typically allowed to post messages and to read those posted by other clients. Hung state 179 is used to simulate a temporary or permanent error condition in the status of a client or in the communication between client and server. Dead state 164 represents a client whose communication with the server has been terminated, generally by an error condition that was not reversed.

One skilled in the art will understand how to convert the exemplary client states presented in FIGS. 10–12 or other states into computer-readable code, thereby providing the state transition rules of state transition rules storage element 118 of FIG. 6. As mentioned herein, the state transition rules preferably include probabilities, or I/O request frequencies, associated with each event. For example, the state transition rules might specify that a simulated client in logged-on state 160 is to do nothing 170 10% of the time, initiate a join channel request 176*a* 50% of the time, initiate a list channel request 172*a* 20% of the time, initiate a list users request 174*a* 10% of the time, and initiate a logoff request 180*a* 10% of the time. A more sophisticated stress test may provide each simulated client with its own set of I/O request frequencies, which may be different from those of other simulated clients. In any event, the state transition rules and the I/O request frequencies are selected to approximate actual client activity as closely as is desired.

The normal client defined in FIG. 10 has the most limited I/O request options among the three types of clients illustrated herein. A host client is permitted to execute all the I/O requests that are available to a normal client plus additional requests. FIG. 11 includes further events and intermediate states available to a host client in in-channel state 162 in addition to those of FIG. 10. Events 202 and 204 are included in FIG. 11 to indicate that FIG. 11 includes all events and states of FIG. 10. In particular, event 202 includes events 176*c*, 182, 186*c*, 188*c*, and 190*d* of FIG. 10. Likewise, event 204 includes events 182, 186*a*, 188*a*, 190*a*, and 192 of FIG. 10.

A sysop client also has available all the events and states of the normal client of FIG. 10 plus additional events and states that are shown in FIG. 12. FIG. 12 also includes the above-described events 202 and 204 to indicate that all events of FIG. 10 are 18 included in FIG. 12. The following tables summarize the events and states of FIGS. 10–12:

TABLE 1

States and Events of FIG. 10 for Normal Client

| Event | Previous State | New State |
| --- | --- | --- |
| Do nothing 166 | Logged-off 158 | Logged-off 158 |
| Logon request 168a | Logged-off 158 | Logged-on pending 168b |
| Logon successful 168c | Logged-on pending 168b | Logged-on 160 |
| Logon unsuccessful 168d | Logged-on pending 168b | Logged-off 158 |
| Do nothing 170 | Logged-on 160 | Logged-on 160 |
| List channels request 172a | Logged-on 160 | List channels pending 172b |
| List channels complete 172c | List channels pending 172b | Logged-on 160 |
| List users request 174a | Logged-on 160 | List users pending 174b |
| List users complete 174c | List users pending 174b | Logged-on 160 |
| Join channel request 176a | Logged-on 160 | Join channel pending 176b |
| Join channel successful 176c | Join channel pending 176b | In-channel 162 |
| Join channel unsuccessful 176d | Join channel pending 176b | Logged-on 160 |
| Begin hung connection 178 | Logged-on 160 | Hung 179 |
| Logoff request 180a | Logged-on 160 | Logged-off pending 180b |
| Logoff successful 180c | Logged-off pending 180b | Logged-off 158 |
| Logoff unsuccessful 180d | Logged-off pending 180b | Logged-on 160 |
| Do nothing 182 | In-channel 162 | In-channel 162 |
| Talk request 186a | In-channel 162 | Talk pending 186b |
| Talk complete 186c | Talk pending 186b | In-channel 162 |
| Whisper request 188a | In-channel 162 | Whisper pending 188b |
| Whisper complete 188c | Whisper pending 188b | In-channel 162 |
| Part channel request 190a | In-channel 162 | Part channel pending 190b |
| Part channel successful 190c | Part channel pending 190b | Logged-on 160 |
| Part channel unsuccessful 190d | Part channel pending 190b | In-channel 162 |
| Begin hung connection 192 | In-channel 162 | Hung 179 |
| Continue hung connection 193 | Hung 179 | Hung 179 |
| Disconnect 194 | Hung 179 | Dead 164 |
| Recover 195 | Hung 179 | Logged-on 160 |
| Recover 197 | Hung 179 | In-channel 162 |
| Revert to logged-off 199 | Dead 164 | Logged-off 158 |

TABLE 2

Additional States and Events of FIG. 11 for Host Client (Includes all events and states of FIG. 10)

| Event | Previous State | New State |
| --- | --- | --- |
| Change channel limits request 196a | In-channel 162 | Change channel limits pending 196b |
| Change channel limits complete 196c | Change channel limits pending 196b | In-channel 162 |
| Change topic request 198a | In-channel 162 | Change topic pending 198b |
| Change topic complete 198c | Change topic pending 198b | In-channel 162 |
| Kick user request 200a | In-channel 162 | Kick user pending 200b |
| Kick user complete 200c | Kick user pending 200b | In-channel 162 |

TABLE 3

Additional States and Events of FIG. 12 for Sysop Client
(Includes all events and states of FIG. 10)

| Event | Previous State | New State |
| --- | --- | --- |
| Change channel limits request 196a | In-channel 162 | Change channel limits pending 196b |
| Change channel limits complete 196c | Change channel limits pending 196b | In-channel 162 |
| Change topic request 198a | In-channel 162 | Change topic pending 198b |
| Change topic complete 198c | Change topic pending 198b | In-channel 162 |
| Kick user request 200a | In-channel 162 | Kick user pending 200b |
| Kick user complete 200c | Kick user pending 200b | In-channel 162 |
| Kill channel request 206a | In-channel 162 | Kill channel pending 206b |
| Kill channel complete 206c | Kill channel pending 206b | In-channel 162 |
| Kill users request 208a | In-channel 162 | Kill users pending 208b |
| Kill users complete 208c | Kill users pending 208b | In-channel 162 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system including multiple clients communicating with a server, wherein the server receives requests from the multiple clients, a method for using a single processor for simulating the multiple clients for testing a server stress, said method comprising the steps of:

initiating execution of a send data thread for selecting one of the simulated multiple clients, wherein each of the simulated multiple clients is controlled by said send data thread of the single processor, said send data thread being adapted to initiate a plurality of I/O requests that result in a transmission being sent to said server for each of said simulated multiple clients;

initiating execution of a receive data thread, said receive data thread being adapted to process completed I/O requests initiated by said send data thread for each of said simulated multiple clients;

providing a data array wherein are stored state variables, each of said state variables representing a simulated state of one of said simulated multiple clients;

selecting, by said send data thread, one of said state variables and initiating an I/O request in response to said selected one of said state variables; and receiving, by said receive data thread, notification of completion of said initiated I/O request and updating in said data array said selected one of said state variables.

2. A method for using a single processor for simulating the multiple clients for testing a server stress as defined in claim 1, said method further comprising:

executing more than once said step of selecting, by said send data thread, one of said state variables and initiating an I/O request in response to said selected one of said state variables; and executing more than once said step of receiving, by said receive data thread, notification of completion of said initiated I/O request and updating in said data array said selected one of said state variables.

3. A method for using a single processor for simulating the multiple clients for testing a server stress as defined in claim 2, further comprising the step of comparing the completion frequency at which notifications of completion of said I/O requests are received by said send data thread to the initiation frequency at which said I/O requests are initiated by said receive data thread.

4. A method for using a single processor for simulating the multiple clients for testing a server stress as defined in claim 1, further comprising the step of measuring a response time for said initiated I/O request, said response time being defined as the duration of time that elapses between initiating said I/O request and receiving said notification of said completion of said I/O request.

5. A method for using a single processor for simulating the multiple clients for testing a server stress as defined in claim 1, further comprising the steps of:

said send data thread waiting a specified amount of time after initiating said I/O request; and initiating, by said send data thread, a second I/O request.

6. A method for using a single processor for simulating the multiple clients for testing a server stress as defined in claim 1, wherein initiating said I/O request comprises selecting one of a plurality of possible I/O requests that are associated with the simulated state represented by said selected one of said state variables.

7. A method for using a single processor for simulating the multiple clients for testing a server stress as defined in claim 6, wherein each of said plurality of possible I/O requests has associated therewith a relative frequency such that selecting one of said plurality of possible I/O requests is conducted according to a predetermined probability.

8. In a system including a test client in communication with a server, wherein the server is configured to communicate with multiple clients, a method for simulating multiple clients on the test client for testing a server, said method comprising the test client performing acts of:

initiating a send data thread, said send data thread being adapted to initiate I/O requests that will result in a transmission being sent to said server, for each of the simulated multiple clients;

initiating a receive data thread, said receive data thread being adapted to process completed I/O requests initiated by said send data thread, for each of the simulated multiple clients;

providing a data array wherein are stored state variables, each of said state variables representing a simulated state of one of the simulated multiple clients;

repeating more than once for each of the simulated multiple clients, by said send data thread, the steps of:
      selecting one of said state variables; and
      initiating an I/O request in response to said selected one of said state variables; and
   repeating more than once for each of the simulated multiple clients, by said receive data thread, the steps of:
      determining whether said completed I/O request indicates that the simulated state of one of the simulated multiple clients is to be updated; and
      if said completed I/O request indicates that said simulated state of said one of the simulated multiple clients is to be updated, updating in said data array the state variable that represents said simulated state of said one of the simulated multiple clients.

9. A method for simulating multiple clients on the test client for testing a server as defined in claim 8, further comprising the steps of:
initiating a software object adapted to monitor said server to detect said completed I/O request;
detecting, by said software object, said completed I/O request; and
sending, by said software object, notification of said completed I/O request to said receive data thread.

10. A method for simulating multiple clients on the test client for testing a server as defined in claim 8, wherein said notification of said completed I/O request includes a parameter identifying one of the simulated multiple clients with which said completed I/O request is associated.

11. A method for simulating multiple clients on the test client for testing a server as defined in claim 8, wherein said initiated I/O requests are selected such that said simulated multiple clients simulate local area network clients.

12. A method for simulating multiple clients on the test client for testing a server as defined in claim 8, wherein said initiated I/O requests are selected such that said simulated multiple clients simulate wide area network clients.

13. A method for simulating multiple clients on the test client for testing a server as defined in claim 12, wherein said simulated wide area network clients are Internet clients.

14. A method for simulating multiple clients on the test client for testing a server as defined in claim 8, wherein said initiated I/O requests are selected such that said simulated multiple clients simulate chat server clients.

15. A method for simulating multiple clients on the test client for testing a server as defined in claim 8, comprising the step of reading and applying state transition rules in order to select one of a plurality of possible I/O requests that are associated with the simulated state that is represented by said selected one of said state variables.

16. In a system including a server that communicates with multiple clients, wherein an ability of the server to service multiple requests from the multiple clients is unknown, a method for simulating multiple clients for testing a server, said method comprising the steps of:
initiating a single send data thread for the simulated multiple clients, said send data thread being adapted to initiate I/O requests that will result in a transmission being sent to said server;
initiating a single receive data thread for the simulated multiple clients, said receive data thread being adapted to process completed I/O requests initiated by said send data thread;
providing a data array having stored therein at least a first state variable that represents a first simulated state and a second state variable that represents a second simulated state, said first simulated state being associated with a first simulated client and said second simulated state being associated with a second simulated client;
initiating, by said send data thread, a first I/O request associated with said first simulated client and a second I/O request associated with said second simulated client:
receiving, by said receive data thread, notification of completion of one of said first I/O request and said second I/O request; and
updating, by said receive data thread, one of said first state variable and said second state variable selected in response to said completion of one of said first I/O request and said second I/O request.

17. A computer program product for implementing, in a system including a server in communication with multiple clients, wherein an ability of the server to service multiple requests from the multiple clients is unknown, a method for testing the ability of the server to service multiple requests by having a test client simulate the multiple clients, the computer program product comprising:
a computer-readable medium having computer-executable instructions for implementing the method, the method comprising acts of:
storing a plurality of simulated client profiles each representing an associated simulated client, each of said simulated clients profiles comprising client profile data including at least a simulated client state;
sending I/O requests on behalf of all of said simulated multiple clients using a send thread, wherein the act of sending further comprises:
selecting one of said simulated client profiles in order to initiate a client action on behalf of the associated simulated client;
initiating an I/O request to a server in order to simulate said client action with the send thread; and
monitoring the completion status of all I/O requests initiated by the send thread;
receiving completed I/O requests on behalf of all of said simulated clients using a receive thread, the act of receiving further comprising:
receiving notification of a completed I/O request associated with one of said simulated clients; and
updating the simulated client state associated with said simulated client in accordance with said completed I/O request.

18. A computer program product as defined in claim 17, further comprising an act of measuring a response time for one of said I/O requests, wherein said response time is defined as the duration of time that elapses between initiating said one of said I/O requests and receiving notification of completion of said one of said I/O requests.

19. A computer program product as defined in claim 17, wherein said act of sending comprises one executable software thread for sending said I/O requests on behalf of all of said simulated clients.

20. A computer program product as defined in claim 17, wherein said computer-executable instructions are executed by one or more computer processors and wherein said act of sending comprises a number of executable software threads equal to the number of said one or more computer processors.

21. A computer program product as defined in claim 17, wherein said act of receiving completed I/O requests further comprises means for identifying said one of said simulated clients that is associated with said completed I/O request.

22. A computer program product as defined in claim 21, wherein said act of receiving competed I/O requests further comprises means for determining whether said completed I/O request indicates that at least one of said simulated client states is to be changed.

23. A computer program product as defined in claim 17, wherein said act of selecting one of said simulated client profiles comprises an act of specifying one of said simulated clients on whose behalf said client action is to be initiated.

24. A computer program product as defined in claim 17, wherein said act of sending further comprises an act of storing state transition rules that define possible simulated client states and that associate with each of said possible simulated client states at least one possible I/O request.

25. A computer program product as defined in claim 24, wherein said act of selecting further comprises an act of reading said state transition rules in order to select, from among said at least one possible I/O request, the I/O request that is to be initiated by said means for initiating.

26. A computer program product as defined in claim 17, wherein said act of sending further comprises an act of delaying, such that a selected amount of time elapses between initiation of an I/O request by said means for initiation and subsequent selection of one of said simulated client profiles by said means for selecting.

* * * * *